United States Patent
Christen et al.

(10) Patent No.: US 10,041,624 B2
(45) Date of Patent: Aug. 7, 2018

(54) LINEAR LIFTING PILLAR

(71) Applicants: Andreas Christen, Safenwil (CH); Dominik Gerber, Muttenz (CH)

(72) Inventors: Andreas Christen, Safenwil (CH); Dominik Gerber, Muttenz (CH)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/079,473

(22) Filed: Mar. 24, 2016

(65) Prior Publication Data

US 2016/0281912 A1  Sep. 29, 2016

(30) Foreign Application Priority Data

Mar. 24, 2015 (DE) .................. 10 2015 205 355

(51) Int. Cl.
*F16M 11/26* (2006.01)
*A47B 9/20* (2006.01)
*A47C 3/40* (2006.01)
*F16C 29/12* (2006.01)

(52) U.S. Cl.
CPC ............... *F16M 11/26* (2013.01); *A47B 9/20* (2013.01); *A47C 3/40* (2013.01); *F16C 29/12* (2013.01); *A47B 2200/002* (2013.01)

(58) Field of Classification Search
CPC ..... F16M 11/26; A47B 9/20; A47B 2200/002; A47C 3/40; A01K 31/14; B62D 1/192
USPC .... 248/125.8; 403/104, 109.3, 109.8, 109.6; 74/492
See application file for complete search history.

(56) References Cited

U.S. PATENT DOCUMENTS

| 6,343,568 B1 * | 2/2002 | McClasky ............... A01K 31/14 119/428 |
| 2007/0039403 A1 * | 2/2007 | Manwaring ............ B62D 1/192 74/492 |

FOREIGN PATENT DOCUMENTS

| DE | 1429584 A1 | 8/1973 |
| DE | 20214377 U1 * | 2/2004 ............... A47B 9/20 |

* cited by examiner

*Primary Examiner* — Todd M Epps
(74) *Attorney, Agent, or Firm* — Bryan Peckjian; SKF USA Inc. Patent Dept.

(57) ABSTRACT

Embodiments relate to a lifting pillar having at least a first tube and at least a second tube that is axially movably arranged within the first tube. Further, the lifting pillar provides at least one sliding element arranged between the first tube and the second tube. The sliding element is in direct contact with the first tube and the second tuber and is axially movably arranged in relation to the first tube and the second tube.

12 Claims, 7 Drawing Sheets

LINEAR LIFTING PILLAR

CROSS REFERENCE TO RELATED APPLICATIONS

This application claims priority to German patent application number 102015205355.5 filed on Mar. 24, 2015, the contents of which are fully incorporated herein by reference.

TECHNOLOGICAL FIELD

Embodiments concern a lifting pillar. Conventional telescopic pillars or lifting pillars mostly comprise a drivetrain, a plurality of telescopically moveable tubes and a guiding and/or sliding system. A pressure and/or pull force may be applied by the drivetrain, for displacing them in relation to each other. In most cases, stability against bending and torsion of individual tubes in relation to each other is affected by the guiding and/or sliding system.

BACKGROUND

The individual tubes are mostly manufactured from metal or from any other material, wherein individual plain bearings are fixed as guiding and/or sliding system, thereto. One side of the plain bearing slides along a surface of the next largest or next smaller tube. For counteracting torsional forces, some of the conventional tubes have recesses or rails, guiding the plain bearings mounted to the other tube. A distance between the tubes and the plain bearings may be adjusted by washers or flat washers. The adjustment is often performed by a screw and/or an inclined surface. In some conventional lifting pillars, plain bearings are replaced by roller bearings.

Due to the arrangements described, the plain bearings and the slide and/or guiding system of conventional lifting pillars may have a comparatively large dimension. Thereby, a gap between two tubes may become comparatively large. In some lifting pillars, an effort for selecting a plain bearing with the required thickness or for shimming it accordingly, may also be increased due to the fact that a plurality of plain bearings are part of a sliding system. For example, three plain bearings may be provided for round tubes, and tubes with a rectangular cross-section may be provided with four plain bearings, thus one on each side, or even eight plain bearings, thus two at each corner. Often, a number of plain bearings may additionally duplicate, since the plain bearings may be inserted at both ends of the tubes.

SUMMARY

There is a need, to improve a lifting pillar in such a way, that it withstands bending and torsional forces, but to keep a gap between the tubes as small as possible. In addition, the mounting effort should be facilitated Embodiments relate to a lifting pillar with at least a first tube and at least a second tube, which is movably arranged within the first tube in axial direction. Further, the lifting pillar comprises at least one sliding element arranged between both tubes. Thereby, the sliding element is in direct contact with both tubes and is arranged to be movable in axial direction in relation to both tubes. In some embodiments, it may be achieved, to keep a gap between both tubes as small as possible by arranging the sliding element in immediate contact with the first and second tube, and by its movability in axial direction in relation to the first and the second tube. Furthermore, in some embodiments, an adjustment and mounting effort may be reduced due to the fact that the sliding element is not fixed to any one of the tubes.

Additionally, a sliding path of the sliding element along the first and/or second tube may correspond to a dimension of the sliding element in an axial direction. Due to that, in some embodiments, it may be allowed, that the sliding element has a maximal sliding path in relation to both tubes.

Additionally or alternatively, the lifting pillar may comprise at least one abutment, which is designed, for limiting a movement of the sliding element in axial direction. Due to that, in some embodiments, it may be prevented, that the sliding element drops out from between both tubes.

Additionally or alternatively, the sliding element may be arranged at side faces of each of the first and second tube. Embodiments of lifting pillars, which have a triangular, rectangular, hexagonal, octagonal or other polygonal cross-sectional shape, may thus be secured, for example, against rotation. The sliding element might be arranged in a central region of the side face, and might be spaced from one edge of the side face by at least a factor of 0.1, 0.2, 0.3, 0.4, 0.5, 0.6, 0.7, 0.8 of an extent of the side face between both edges. In case the tube comprises a cross-sectional shape with alternatingly arranged shorter and longer side faces in relation to a circumferential direction, the sliding element may be arranged at a longer side face. For example, the tube may also have an octagonal cross-section, wherein each of two longer sides are joined by a shorter side face. Such tubes may also be referred to as tubes with chamfered corners or as a tube with a substantially rectangular cross-section. With such tubes, the sliding elements may be arranged at the longer side faces. The cross-section of the tube may be a shape of the tube perpendicular to the axial direction.

Additionally or alternatively, the lifting pillar may comprise at least two sliding elements, arranged at opposing or at mutually parallel side faces. In some embodiments, a uniform force distribution may be provided, thereby. The lifting pillar may also comprise just two sliding elements or just four sliding elements.

Additionally or alternatively, the lifting pillar may comprise at least two stationary gliding structures, which are arranged between the first tube and the second tube and which are stationary at least in axial direction in relation to one of the tubes. In some embodiments, bending forces, occurring between the first and the second tube, may be supported by the stationary gliding structures. For example, the at least two gliding structures may be arranged at a corner, for e.g. rectangular tubes. For tubes comprising an octagonal cross-section, the stationary gliding structures may be arranged, at the side faces having a smaller extent. Additionally, the at least one sliding element may be arranged at a side face between both gliding structures. In other words, the gliding structures may be structures, which are arranged adjacent to each other in circumferential direction and which are arranged non-overlapping with the sliding element within a sliding path of the sliding element. Thereby, in some embodiments, dimensions of the sliding element and of the gliding structure may be kept as small as possible across a width of the gap.

Additionally or alternatively, at least one of the tubes may have a guiding structure, which is adapted to guide the sliding element in axial direction and to prevent the sliding element from moving transverse to the axial direction and parallel to the side face. In some embodiments, an axial guiding of the sliding element may be achieved thereby. In some cases, movements parallel to the side wall may be allowed to a small degree, which might be due to manufacturing tolerances. However, these tolerances may be, for example, at most 0.005 mm, 0.001 mm or 0.01 mm.

Additionally or alternatively, the sliding element may be arranged between the first and the second tube having an initial load. Thereby, in some embodiments, a weight of the sliding element may be supported. The initial load, for instance, may have a value, which has a range with an initial value and/or final value of 1 N, 5 N, 8 N, 10 N, 12 N, 15 N, 16 N, 17 N, 18 N, 19 N, 20 N, 22 N, 25, 30 N, 35 N, 40 N, 45 N, 50 N.

Additionally or alternatively, the sliding element may be arranged for sliding at the guiding structure in form-fitting manner. In some embodiments, the sliding element may be prevented from performing a movement transverse to the axial direction and parallel to the side face by correlating structures. In some embodiments, the guiding structure may have a recess and, correspondingly, the sliding element may have as counter-guiding structure, for example, a corresponding protrusion engaging with the recess. Analogously, also the guiding structure may have at least one protrusion and/or the counter-guiding structure may have a corresponding recess. These recesses and, correspondingly, also the protrusions may have any suitable shape, for example, rectangular, semicircular, circular segmented, triangular or the like. In principle, also a plurality of protrusions and/or recesses may be combined in a guiding structure. The sliding element may then have a corresponding counter-guiding structure. Additionally or alternatively, a plurality of recesses and/or protrusions may be arranged parallel to each other and/or parallel to the axial direction.

Additionally or alternatively, the at least one sliding element may be freely movable in axial direction in at least a particular area, and may be arranged between the first and the second tube directly at a side face. Then, two or four gliding structures may be provided at least at one of the tubes, wherein each of the guiding structures overlaps a corner or a short side face of the tube. In some embodiments, this may allow for a lifting pillar guiding system with stationary gliding structures and freely movable sliding element which sufficiently absorbing bending and torsional forces, and at the same time, for keeping the gap between both tubes as small as possible.

The disclosed embodiments of the description above, the subsequent claims and the attached figures as well as their individual features may both, individually and in any combination, be significant and implemented for realizing an embodiment in its various arrangements.

BRIEF DESCRIPTION OF THE DRAWINGS

Thus, the figures are schematically showing the following views.

DETAILED DESCRIPTION

In the following description of the accompanying illustrations, same reference signs indicate same or comparable components. Further, summarizing references signs are used for components and objects, which multiplicitly occur in an embodiment or in an illustration, but, which are described in combination regarding to one or more features. Unless otherwise, explicitly or implicitly, indicated in the description, components or objects, which are indicated with same or summarizing references signs, may be formed uniformly or, where required, differently, regarding to single, multiple or all features, such as their dimensions.

Figure 1:
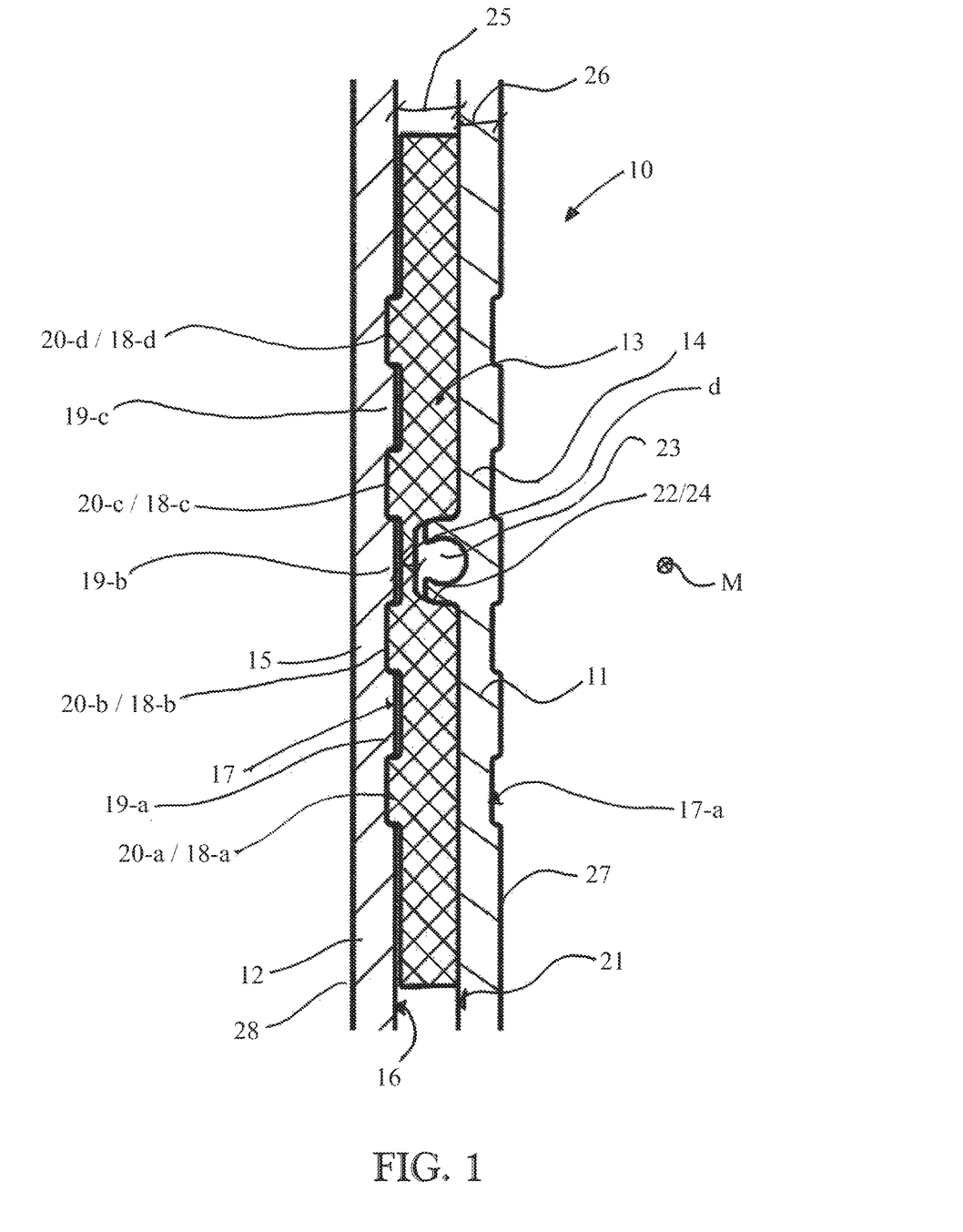
FIG. 1 shows a detail of a schematic cross-section of a lifting pillar according to one embodiment.
Figure 2:
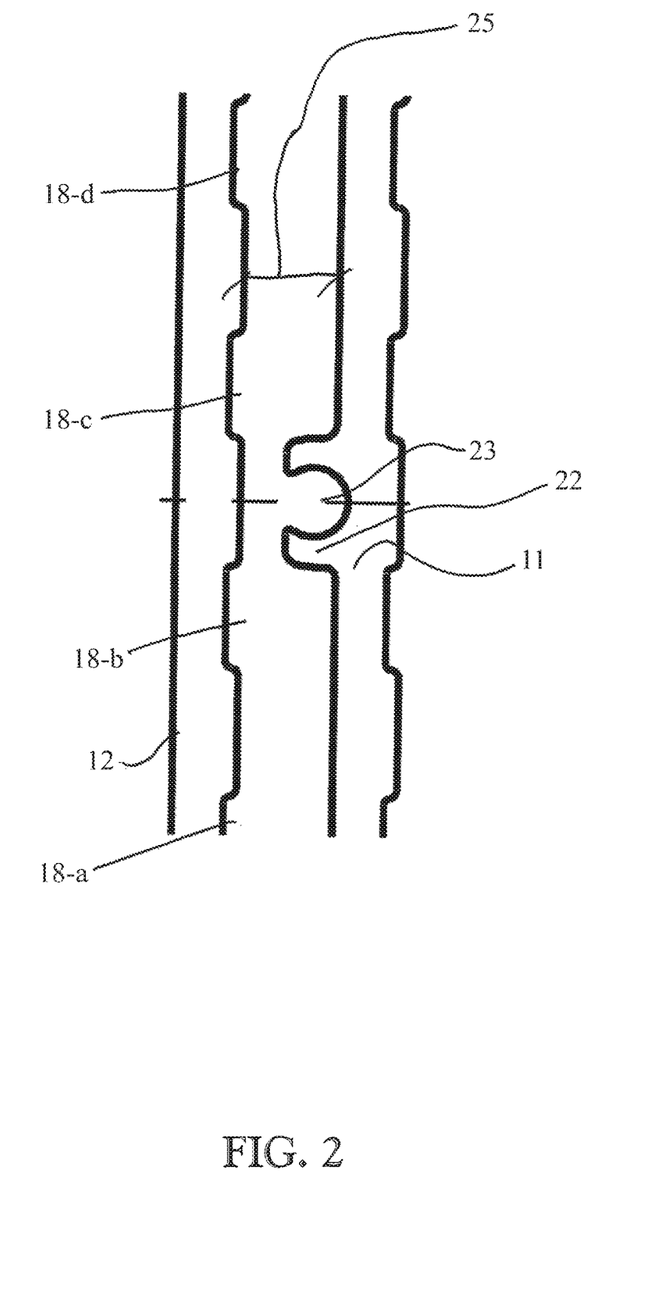
FIG. 2 shows a detail of a schematic cross-section through another sectional plane compared to FIG. 1.
Figure 3:
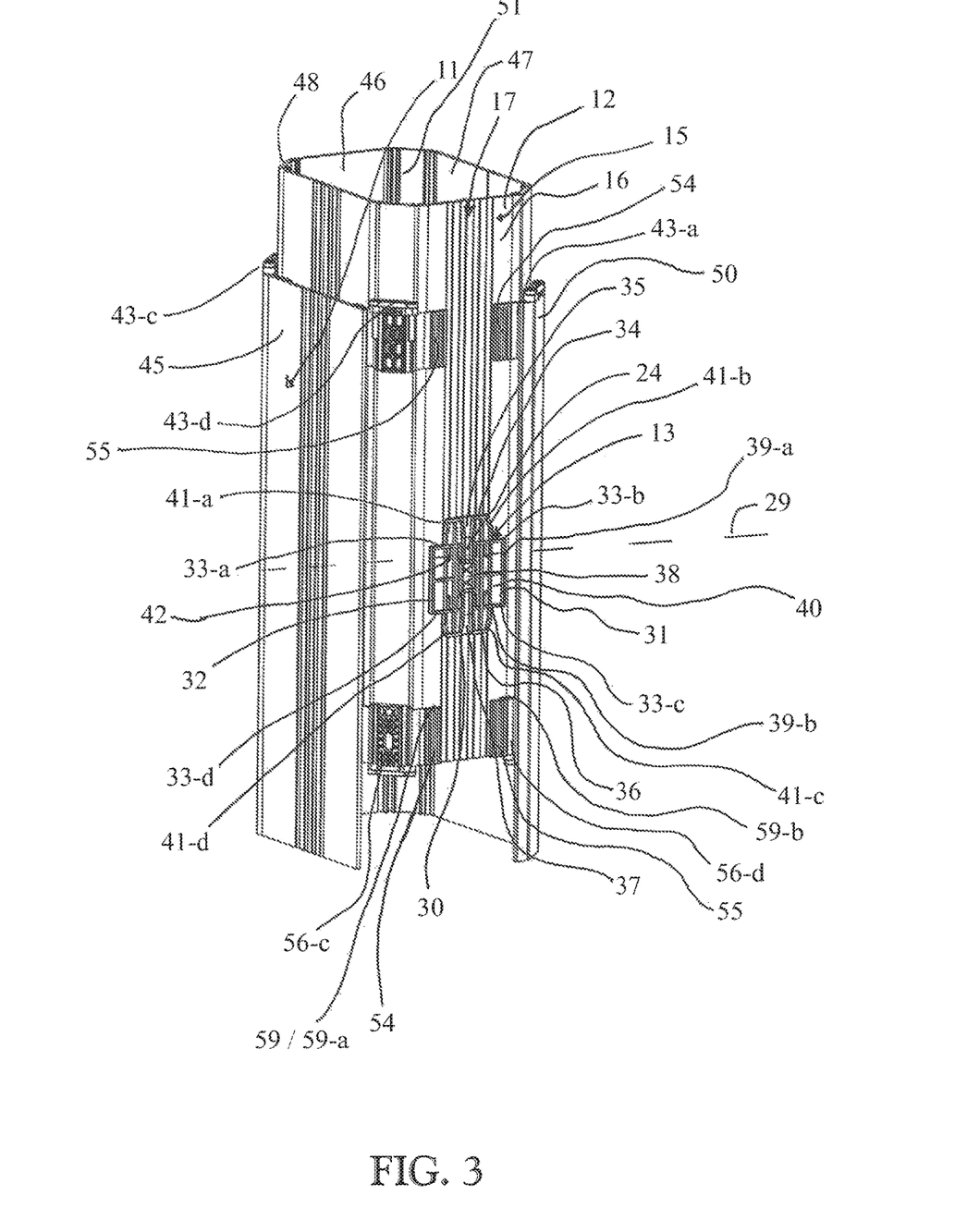
FIG. 3 shows a schematic perspective view of the lifting pillar according to the embodiment of FIGS. 1 and 2, wherein one outer side face of the outer tube is removed.

FIGS. 1 and 2 schematically illustrate, cross-sectional views of a lifting pillar 10 in different cross-sectional planes, wherein cross-sectional plane of FIG. 1 extends through a sliding element 13 of the lifting pillar, and cross-sectional plane of FIG. 2 extends outside of the sliding element 13. In FIG. 3, a cross-sectional plane 29 is shown, which is the cross-sectional plane of FIG. 1. The lifting pillar 10 comprises at least a first tube 11 as well as a second tube 12. The second tube 12 is movably arranged in axial direction M within the first tube 11. The sliding element 13 is arranged between the first tube 11 and the second tube 12, and is in direct contact with the first tube 11 as well as with the second tube 12. Further, the sliding element 13 is movably arranged in axial direction in relation to both tubes 11 and 12.

In the detail shown in FIG. 1, a section of a side face 14 of the first tube 11 as well as a section of a side face 15 of the second tube 12 are illustrated, only. The tubes 11 and 12 have an octagonal cross-section, which is described in detail below. In some other embodiments (not shown), any component having a lateral surface encompassing a cavity may be designated as tube. The tube may have e.g. a circular, a rectangular, a hexagonal, a triangular cross-section and/or the like. The first and second tubes may have the same cross-sectional shape, wherein the second tube is scaled down compared to the first tube. Thereby, a diameter of the first tube or a distance between two opposing side faces of the first tube may be greater than the diameter of the second tube or a distance between its two opposing side surfaces, e.g. by at least a factor of 1.1, 1.2, 1.3, 1.4, 1.5 and/or maximally by a factor of 1.6.

The lifting pillar 10 may comprise a driving element, not shown in FIG. 1, which effects a displacement of the first tube 11 in relation to the second tube 12. For displacing both tubes 11 and 12 in relation to each other, both, the first tube 11 may be stationary and the second tube 12 may be movable. Likewise, the second tube 12 may be arranged stationary and the first tube 11 may be movably arranged in relation to the second tube 12. Optionally, both tubes 11 and 12 may be movably in relation to each other in different directions.

Figure 4:
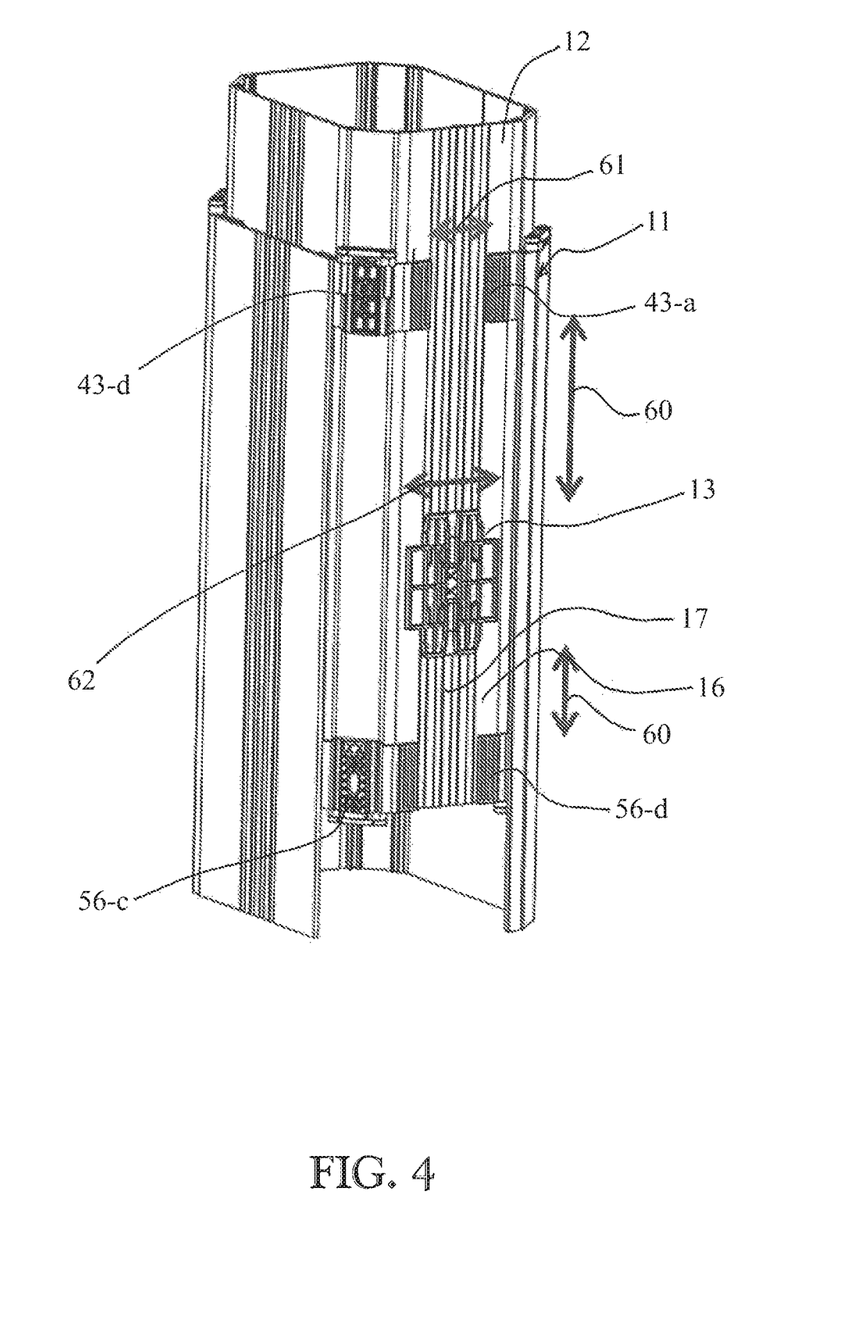
FIG. 4 shows a schematic perspective view of the lifting pillar of embodiment of FIG. 3, wherein further sizes and dimensions are indicated.

FIGS. 3 and 4 are showing further illustrations of the lifting pillar 10, wherein the side face 14 of the first and outer tube 11 is removed, for a better illustration of the sliding element 13. The sliding element 13 is a plain bearing. It comprises plastic, e.g. polyoxymethylene (POM) as a material. All other suitable materials or plastics, e.g. thermoplastics, polytetrafluoroethylene (PTFE) or the like, may be used as material for the sliding element 13. The sliding element 13 may also comprise different combinations of materials of the said materials. The sliding element 13 is a one-piece component. In some further embodiments (not shown), the sliding element may also be composed of a plurality of components, which are yet arranged to be all together movable in axial direction in relation to the tubes. In some further embodiments (not shown), the sliding element may be any component, which serves as a plain bearing and/or allows and supports, respectively, a relative movement of two components, for example, of the first and the second tube. The sliding bearing may be adapted to reduce a friction coefficient, which would otherwise occur by displacing both tubes directly. Two components, e.g. sliding element 13 and one of the tubes 11 or 12, which are in direct contact with each other, may be arranged in such a way, that no further elements or components, made e.g. from a solid material, may be arranged in-between. In some circumstances, a thin lubricating film from a lubricant may be formed between the sliding element and at least one of the tubes or the components, even if the components are in direct contact with each other. A component, that is movably arranged in relation to another, e.g. the sliding element in relation to the first tube and/or the second tube, may conduct a movement in axial direction relative to the tube.

The second tube 12 comprises a guiding structure 17 for the sliding element 13 at its radially outwards facing side face 16, which is in direct contact with the sliding element 13. The guiding structure 17 comprises four recesses 18-a, 18-b, 18-c and 18-d. All recesses 18-a to 18-d have the same rectangular cross-section. Over the side face 16, the recesses 18-a to 18-d are each spaced by protrusions 19-a to 19-c. The protrusions 19-a to 19-c also have the same rectangular cross-section. Over the side face 16, the protrusions 19-a to 19-c have a marginally greater dimension than the recesses 18-a to 18-d. The protrusions 19-a to 19-d terminate at a surface of the side face 16. In some further embodiments, which are not shown, both, the recesses and the protrusions may have any cross-section, for example, triangular, semi-circular, circular segmented or the like. Likewise, the individual protrusions and/or recesses may have different cross-sectional shapes. In some further embodiments (not shown), the protrusions may protrude over a cross-sectional extent of the side face. Thereby, the guiding structure 17 is adapted to guide the sliding element 13 in axial direction M and to prevent a movement of the sliding element 13 transverse to the axial direction and parallel to the side face 16. In some embodiments, due to manufacturing tolerances a movement transverse to the axial direction and parallel to the side face may also be allowed to a certain extent.

The sliding element 13 is adapted to slide at the guiding structure 17 in a form-fitted manner. Thereby, the sliding element 13 comprises four protrusions 20-a to 20-d, which are correspondingly designed to the recesses 18-a to 18-d on a side face 16 facing side of the sliding element. In some further embodiments (not shown), the sliding element may have any shape, which is suitable for a sliding at the guiding structure at this or at the other side face in a form-fitted manner.

Analogously, the radially inward facing side face 21 of the first tube 11 comprises a guiding structure 22, which is adapted to guide the sliding element 13 in a form-fitted manner. The guiding structure 22 comprises a single protrusion, which is substantially centrically arranged to an area, in which the sliding element 13 is arranged and protrudes from the radially inward facing side face 21. Outside of the protrusion, the sliding element 13 slides along the side face 21. The protrusion of the guiding structure 22 comprises a semi-circular opening 23. In some embodiments, this may serve for mounting further fastening elements, e.g. for electric grounding. Optionally, in some further embodiments, not shown, the semi-circular opening may be omitted, may have a different shape and/or may be closed.

Correlating to the protrusions 22 the sliding element 13 comprises a recess 24, which is adapted for sliding along the protrusion 22 in a form-fitted manner. Thereby, over the side face 16, the recess 24 of the sliding element 13 is arranged in that area, that is opposite to the protrusion 19-b of the side face 16. Thereby, the sliding element 13 has a wall with a particularly thin wall thickness d in its central region. Symmetrically, at the portion of the side face 14 with the thin wall thickness d, the sliding element 13 has a thicker wall thickness, which completely fills a cross-sectional gap 25 between the first tube 11 and the second tube 12. The gap 25 defines a distance between the side faces 16 and 21. The gap 25 may be greater than the wall thickness d, for example, by at least a factor of 1.1, 1.2, 1.3, 1.4, 1.5 2.0, 2.1. Thereby, the gap 25 between the first tube 11 and the second tube 12 may be greater than a wall thickness 26 of tubes 11 and/or 12. For example, the gap 25 may be greater than the wall thickness 26 of tubes 11 and/or 12 by at least a factor of 1.1, 1.2, 1.3, 1.4, 1.5, 1.6, 1.7, 2.0, 2.1, 2.2, 2.3, 2.4 or 2.5. In some embodiments, the wall thickness 26 of the tubes 11 or 12 may be in a range between 1.5 mm and 3.5 mm, for example exactly 2.5 mm. The sliding element 13 and also the gap 25 may comprise a maximum thickness, which is in a range between 2 mm and 6 mm, for example at 4.5 mm.

As, for instance, shown in FIG. 3, the guiding structure 17, which is arranged at the inner second tube 12, extends along the whole extent of the tube 12 in axial direction M. The outer tube 11 has a guiding structure 17-a at the radially outward facing side surface 27. Thereby, the guiding structure 17-a is substantially analogously designed to the guiding structure 17, and serves, for instance, for guiding a further sliding element (not shown) in embodiments, wherein a further tube (not shown) is arranged outside of the first tube 11. Analogously, in some further embodiments (not shown), a guiding structure may also be provided at a radially inward facing side face 28 of the second tube 12. This might be the case in embodiments, wherein a further tube is guided inside of the second tube. Thereby, this guiding structure may be analogously designed to the guiding structure comprising the protrusion 22 and/or may be similarly designed to the guiding structure 17.

As shown in FIG. 3, the sliding element 13 may be shaped as cross, wherein a central region 30, which overlaps the recesses 18-a to 18-d along the side face 16 of tube 12, comprises the protrusions 20-a to 20-d. Side wings 31 and 32 are attached to the central region 30, so that the side wings 31 and 32 enclose the central area 30 at the side face 16. The side wings 31 and 32 have a smaller extent than the central region 30 in axial direction, so that the sliding element comprises four abutments 33-a to 33-d. In the following, the function of the abutments 33-a to 33-d will be described in more detail.

Also in FIG. 3, a recess 24 of the sliding element 13 is shown. The recess 24, which extends over a whole axial extent of the sliding element 13, has a widening auxiliary insertion means 35 at a first end 34 of the sliding element 13. Analogously, the sliding element 13 has an auxiliary insertion means 37 at an opposite second end 36. Over the side face 16, the insertion means 35 and 37 have a larger extent than the recess 24. The insertion means 35 and 37 expand conically and merge gradually into the recess 24. In some embodiments, the insertion means 35 and 37 may serve for facilitating mounting the sliding element 13 to a tube 11. Further, in relation to an extent of the sliding element, the recess 24 overlaps with an opening 38 in a central region of the sliding element 13. The opening 38 may serve as weight reduction means. In addition, the sliding element 13 comprises at each of the ends chamfers 41-a to 41-d. Their function will be explained in more detail below. In some further embodiments (not shown), the chamfers and/or the insertion means may be omitted or may have a different shape.

The sliding element 13 has a grid structure, wherein individual bars 39-a, and bars 39-b, are connected and, for example, encompass a plurality of openings 40. Thereby, the bars 39-a are arranged transverse to the axial direction and in parallel to the side face 16, and the bars 39-b are arranged parallel to the side face 16 in the axial direction. In some embodiments, the grid structure and/or the openings may serve as weight reduction means. The grid structure shown in the sectional view of FIG. 1 is removed. In some embodiments (not shown), the grid structure may have a different shape, for example, diamond-shaped openings, or the sliding element may be solid and/or may have any other shape, which allows for guiding the sliding element in the guiding structure of the tubes in a form-fitted manner.

The sliding element 13 may comprise lubrication pockets, e.g. for receiving a lubricant or grease. These may be provided at each side of the sliding element 13, e.g. at sides facing tube 11 and/or tube 12. Exemplarily, a back side 42 of a lubrication pocket, facing the tube 12 with an open side, is shown in FIG. 3. In some further embodiments (not shown), the lubrication pockets and the opening 38 may be omitted or may have a different shape. For example, the tubes 11 and 12 may have an extent in axial direction, which is greater than an axial extent of the sliding element 13 by at least a factor of 1.1, 1.2, 1.5, 2, 3, 4, 5, 4.5.

Figure 5:
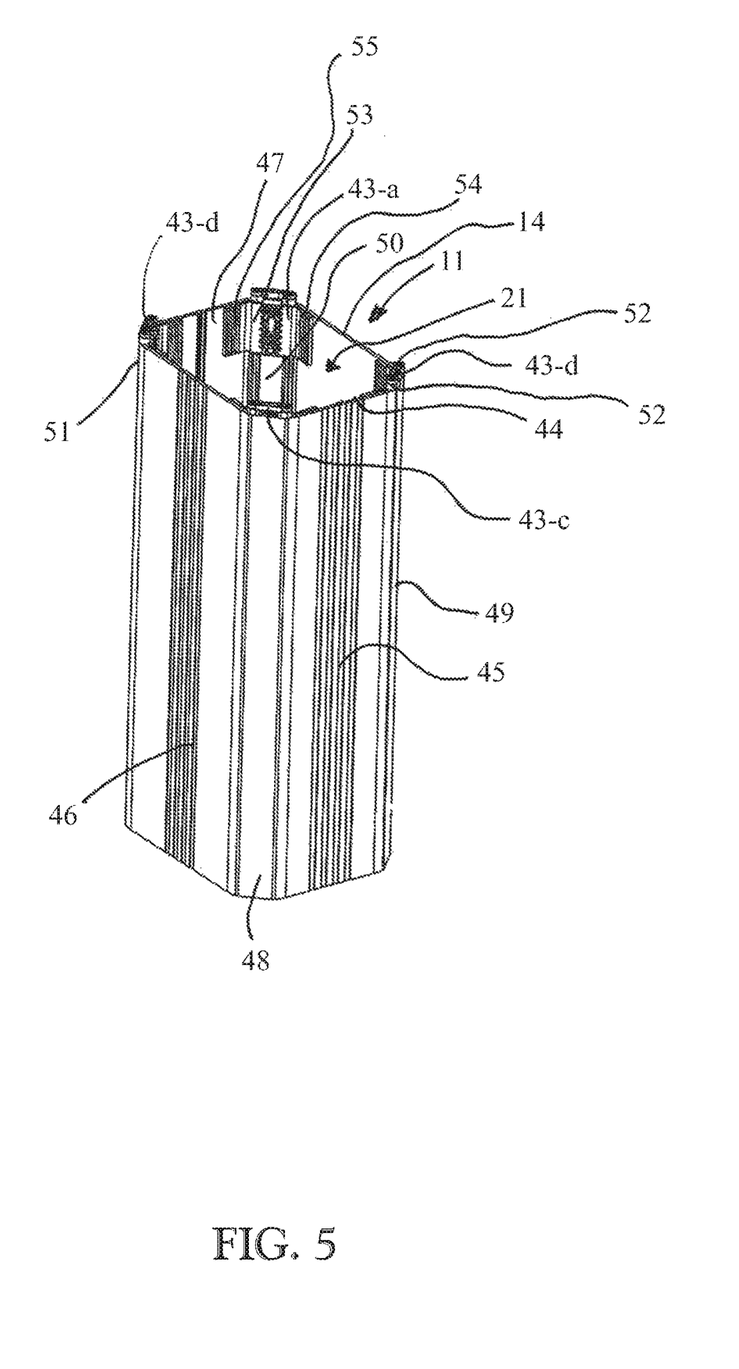
FIG. 5 shows a schematic perspective view of a first tube of the lifting pillar according to the embodiment of FIGS. 1 to 4.
Figure 6:
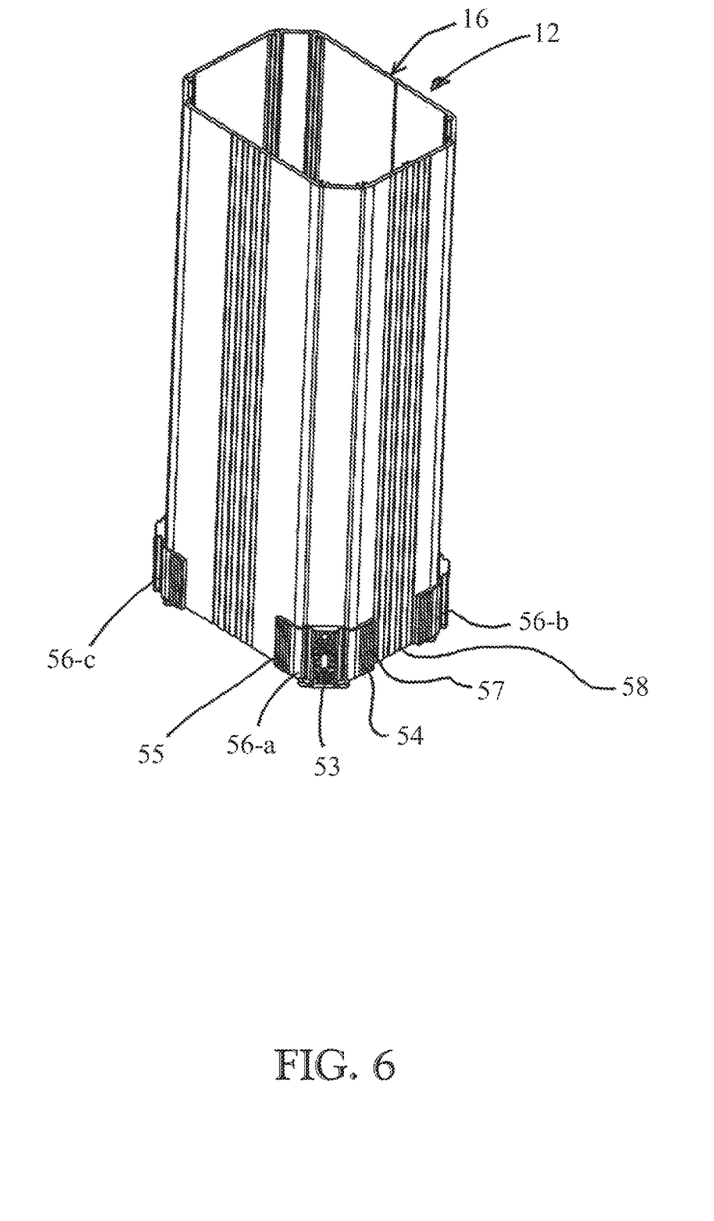
FIG. 6 shows a schematic perspective view of a second tube of the lifting pillar according to the embodiment of FIGS. 1 to 4.

In addition to the plain bearing 13, which is arranged to be freely movable between both tubes 11 and 12, each of the tubes 11 and 12 comprises further gliding structures. For the sake of clarity, the gliding structures will be described with reference to FIGS. 5 and 6, illustrating details of tubes 11 and 12. Four gliding structures 43-a to 43-d are mounted to the first radially outer tube 11. The gliding structures 43-a to 43-d are flush mounted to an end 44 of the tube 11 at the radially inner side face 21 of the tube 11. The gliding structures 43-a to 43-d may also be designated as corner gliders, since they are arranged at the corners of the tube 11 or at each side face of tube 11, and have, in a circumferential direction, a smaller extent than the side face 14, at which the sliding element 13 is arranged. The tube 11 has an octagonal cross-section, wherein the tube 11 has side faces 14, 45, 46 and 47. The side faces 14, 45, 46 and 47 are joined alternately with side faces 48, 49, 50 and 51 having a smaller extent in circumferential direction. Thereby, the tube 11 may appear to have a rectangular cross-section with truncated corners. One of the gliding structures 43-a to 43-d is mounted to one of the shorter side faces 48, 49, 50 and 51. For this purpose, two screws 52 are inserted into each gliding structure 43-a to 43-d. In some further embodiments (not shown), mounting of the gliding structures may be performed in a different manner, for example, by welding, glueing, molding, by rivets and/or the like. The gliding structures may be plain bearings or any other components, which allow for a relative axial movement of tube 11 and tube 12. In addition, the gliding structures 43-a to 43-d may comprise materials, which have already been described for the sliding element 13, or may comprise other materials.

The gliding structures 43-a to 43-d are similarly or identically designed, therefore, only the gliding structure 43-a is described in detail. The gliding structure 43-a has a central region 53, the extent of which over the side face 50 corresponds to an extent of the side face 50. An extent of the gliding structure 43-a in axial direction is smaller than an extent of tube 11 in axial direction of tube 11. Thereby, the tube 11 may be longer than an axial extent of the gliding structure 43-a, by at least a factor of 2, 4, 5, 6, 7, 8, 9, 10, 15. Further, the gliding structure 43-a comprises two side wings 54 and 55, which are arranged to encompass the central region 53 in a circumferential direction of the tube 11. Thereby, the circumferential direction only approximately describes a shape of the tube and is not only related to circular cross-sections. For example, the circumferential direction extends along each side face. The side wings 54 and 55 of the gliding structure 43-a overlap the longer side faces 14 and 47, which are adjacent to the side face 50, at least segmentally but not completely. The side wings 55 and 54 have an extent in axial direction, which corresponds to the extent of the gliding structure 43-a. In some further embodiments (not shown), this extent may also be greater and/or smaller than the one of the central region 43-a. The side wings 54 and 55 comprise recesses or grooves, which are arranged in axial direction. Thereby, in some embodiments (not shown), a sliding property may be improved. In some further embodiments (not shown), the grooves 57 may also be omitted. In some embodiments (not shown), the gliding structure 43-a may also have any other shape, for example, the side wings may be omitted.

Analogously, also the second tube 12 comprises four gliding structures. Three gliding structures 56-a to 56-c are shown in FIG. 6. The four gliding structures 56-a to 56-c and the not shown gliding structure, are mounted to a radially outward facing side face 16 of the tube 12. The gliding structures 56 of the tube 12 are substantially similar to the gliding structure 43-a and also comprise the central region 53 as well as adjoining side wings 54 and 55. The gliding structures 56 are flush mounted to the tube 12 at a downward facing end 58 of the tube 12, shown in FIG. 6. Thus, in an assembled state the gliding structures 56 of the second tube 12 are mounted to one end, which is opposite to the end of the first tube 11 having the gliding structures 43-a. In some further embodiments (not shown), the gliding structures may be each provided at both ends of the tubes and/or may be spaced apart from the end of the tubes.

Figure 7:
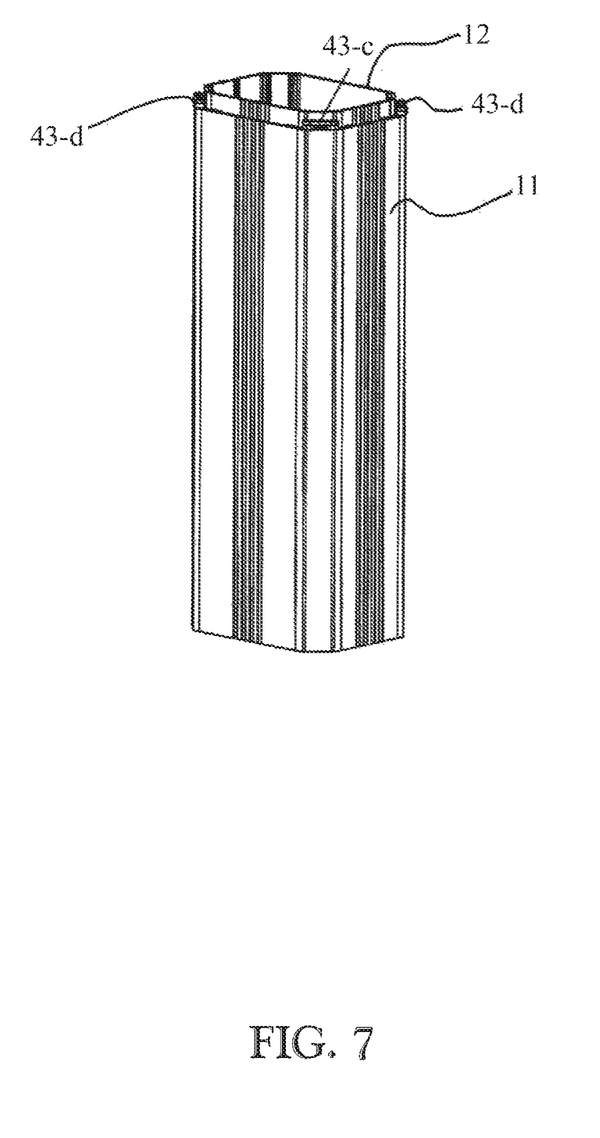
FIG. 7 shows a schematic perspective view of the lifting pillar according to the embodiment of the FIGS. 1 to 6 in an assembled state.

FIG. 7 shows a perspective schematic view of the lifting pillar with the tubes 11 and 12 in an assembled state. Due to the removed side face 14 of the outer tube 11 the arrangement in assembled state is better observable in FIGS. 3 and 4. Particularly, the gliding structures 56-c and 56-d of the second tube 12 are observable. The gliding structures and each of the side wings 54 and 55, which overlap at least partly with the side face 16, provide a delimitation for the sliding element 13 in an axial downward direction. For this purpose, an upper edge 59 of the side wings 54 and 55 serve as abutment for abutting element 33-c and 33-d of the sliding element 13. The upper edge 59-a of side wing 54 serves as abutting element of gliding element 13 and its abutment 33-d serves as abutment surface. The side wings 54 and 55 of the gliding structures 43 and 56 do not overlap with the guiding structure 17 in circumferential direction. In some embodiments, the sliding element 13 is thereby enabled to overlap at least partly with the gliding structures 56-c and

56-*d* in its central region 30. Due to the chamfers 41-*c* and 41-*d* a sliding past of the blades 54 and 55 is facilitated.

Analogously, also the gliding structures 43-*d* and 43-*a*, while are radially inwardly provided at the outer tube 11, and its side wings 55 and 54, serve as abutments for the sliding element 13 in an upward direction and its abutting elements 33-*a* and 33-*b*, respectively. In this case, the chamfers 41-*a* and 41-*b* are adapted to facilitate a sliding past or an inserting of the sliding element 13 between the gliding structures 43-*d* and 43-*a*.

In some further embodiments (not shown), the gliding structures may overlap at least partly with the guiding structure for the sliding element. In some embodiments, thereby a sliding path of the sliding element is limited at an early stage. In some embodiments, the gliding structures, mounted at the tubes, may serve as abutments or sliding delimitations for the sliding element in an axial direction. The two torsion absorbing sliding elements may be adapted to be freely movable within an overlapping area of the tubes, but not outside of the bending force absorbing gliding structures. In some embodiments, bending force absorbing gliding structures support the torsion absorbing sliding elements in their permitted sliding path.

For the sake of clarity, again, movement possibilities and dimensions of the sliding element 13 are depicted with a reduced number of numerals in FIG. 4. The arrows 60 illustrate a sliding path of the sliding element 13. The sliding path extends in parallel to the axial direction over a side face at which the slide element 13 is arranged. In some embodiments, the sliding element 13 may move along the sliding path, for absorbing a torsional force, or for preventing an angular displacement of the first tube 11 relative to the second tube 12, respectively. A maximal sliding path of the sliding element 13 may be, e.g. at least 30%, 40%, 45%, 47%, 48%, 50%, 60%, 70% of an axial extent of one of the tubes 11 or 12. Arrow 61 illustrates a distance between two bending force absorbing gliding structures 43 resp. 56 at the side faces. This distance may correspond, for instance, to an extent or an area taken by the guiding structure in axial direction. Analogously, the arrow 62 illustrates an extent of the sliding element 13 over the side face. The extent of the sliding element 13 in circumferential direction may be, for example, greater than the distance, indicated with arrow 61, so that the gliding structures 43 or 56 may serve as abutment for the sliding element 13 in axial direction.

In other words, some embodiments relate to a gliding system for a lifting pillar, which prevents, inhibits and/or at least minimizes a rotation or torsion between a first and a second tube or between further tubes of a lifting pillar. The gliding system guides the tubes of a lifting pillar and mostly comprises means, for absorbing a bending force, and means, for absorbing a torsional force. In some embodiments these means are realized by two components, which are arranged adjacent to each other along at an extent of the side face in circumferential direction, and do not overlap each other in a gap between the tubes, whereby the gap may be kept small. In some embodiments, the lifting pillar may comprise gliding structures, four of which are mounted to a first end of a first tube, and four of which are mounted to an end of a further tube. The four gliding structures may be stationary arranged at the inner tube, so that they face the other tube. The other four gliding structures may be mounted to the outer tube facing the inner tube. The gliding structures may be provided for absorbing bending forces. Further, the lifting pillar may comprise two further freely movable sliding elements, which are provided for absorbing and/or preventing torsion. Each of the gliding structures may be very thin in a direction between the tubes and still be very sturdy.

In some embodiments, the sliding elements, provided for absorbing torsion, may be arranged, in a small gap between the tubes and are freely movable in relation to at least a guiding structure, a rail and/or a recess. The sliding elements may be inserted freely movable. A torsional force may also be absorbed without mounting the sliding element to one of the tubes. In some embodiments, thereby the sliding system which prevents or inhibits a rotation of the tubes may be enabled to have only few fixation elements and gliding means, since each of the sliding elements or gliding structures needs to absorb a force in only one direction. Therefore, the gliding structures or the sliding element may be exactly adapted to absorb and/or to carry one force from one direction. The purpose of the sliding element and the gliding structure is divided into absorbing either bending forces or torsional forces.

Lifting pillars, also indicated as telescopic columns, may be used in many technical areas for lifting and lowering loads. Examples are adjustment means of medical chairs or beds, or also for all other possible motor-driven height adjustments, such as in desks, worktables or the like.

Embodiments as well as their features disclosed in the description above, the subsequent claims and the attached figures may individually as well as in any combination be important and implemented for realising an embodiment in its various configurations.

REFERENCE ELEMENTS

10 lifting pillar
11 first tube
12 second tube
13 sliding element
14 side face
15 side face
16 radially outwards facing side face
17 guiding structure
18 recess
19 protrusion
20 protrusion/sliding element
21 radially inwardly facing side face
22 protrusion
23 circular opening
24 recess
25 gap
26 wall thickness
27 radially outward facing side face
28 radially inward facing side face
29 sectional plane
30 central region
31 side wing
32 side wing
33 abutment
34 first end
35 insertion means
36 opposite end
37 insertion means
38 opening
39 bar
40 opening
41 chamfer
42 back side of a lubrication pocket
43 gliding structure
44 end
45 side face 46 side face
47 side face
48 corner
49 corner
50 corner/short side face
51 corner/short side face
52 screw
53 central region of the gliding structure
54 side wing
55 side wing/gliding structure
56 gliding structure of the second tube
57 groove
58 other end
59 upper edge
60 arrow
61 arrow
62 arrow
M axial direction
d wall thickness

The invention claimed is:

1. A lifting pillar comprising:
at least a first tube;
at least a second tube, which is axially movably arranged within the first tube; and
at least one sliding element slideably disposed between the first tube and the second tube, each of the at least one sliding element having at least one sliding surface, each at least one sliding surface being linear in an axial direction;
at least one mating sliding surface provided on at least one of the at least one first tube and the at least one second tube,
wherein each sliding surface of the at least one sliding surface slideably engages directly with a respective mating sliding of the at least one mating sliding surface and is axially movably arranged in relation to the first tube and the second tube.

2. The lifting pillar according to claim 1, wherein a sliding path of the sliding element arranged in relation to at least one of the first tube and the second tube corresponds to an extent of the sliding element in an axial direction.

3. The lifting pillar according to claim 1, further comprising at least one abutment adapted to limit a movement of the sliding element in an axial direction.

4. The lifting pillar according to claim 1, wherein the sliding element is arranged at a side face of at least one of the first tube and the second tube.

5. The lifting pillar according to claim 1, further comprising two sliding elements arranged at opposite or at parallel side faces.

6. The lifting pillar according to claim 1, further comprising at least two gliding structures are arranged between the first tube and the second tube and are stationary to one of the first tube or the second tube in at least an axial direction.

7. The lifting pillar according to claim 6, wherein the at least one sliding element is arranged at a side face between two gliding structures.

8. The lifting pillar according to claim 1, wherein at least one of the tubes has a guiding structure adapted to guide the sliding element in an axial direction and to prevent the sliding element from moving transverse to the axial direction parallel to a side face.

9. The lifting pillar according to claim 8, wherein the sliding element is arranged to slide at the guiding structure in a form-fitting manner.

10. The lifting pillar according to claim 1, wherein, in at least a first area, the at least one sliding element is axially freely movably arranged between the first and second tube in direct contact to a side face.

11. The lifting pillar according to claim 1, further comprising at least one of two gliding structures arranged in relation to at least one of the tubes, and wherein each one of the two gliding structures overlaps one of a corner or a shorter side face of the tube.

12. The lifting pillar according to claim 1, further comprising four gliding structures arranged in relation to at least one of the tubes, and wherein each one of the four gliding structures overlaps one of a corner or a shorter side face of the tube.

* * * * *